United States Patent [19]

Bolsworth et al.

[11] Patent Number: 5,588,707
[45] Date of Patent: Dec. 31, 1996

[54] FOLDING SEAT

[75] Inventors: James Bolsworth, Sterling Heights; Robert E. Adamson, Jr., Warren, both of Mich.

[73] Assignee: General Motors Corporation, Detroit, Mich.

[21] Appl. No.: 557,265

[22] Filed: Nov. 14, 1995

[51] Int. Cl.$^6$ ................................................ B60N 2/02
[52] U.S. Cl. ....................... 297/378.12; 297/334; 296/66
[58] Field of Search .................................. 297/331, 334, 297/341, 378.12, 378.1; 296/65.1, 66

[56] References Cited

U.S. PATENT DOCUMENTS

| | | | |
|---|---|---|---|
| 3,311,405 | 3/1967 | Brennan et al. | 296/66 |
| 4,699,418 | 10/1987 | Plavetich | 296/65 R |
| 4,805,953 | 2/1989 | Yamauchi | 296/65.1 |
| 5,482,349 | 1/1996 | Richter et al. | 296/65.1 X |

FOREIGN PATENT DOCUMENTS 3036559  4/1902  Germany ................ 297/341

*Primary Examiner*—Laurie K. Cranmer
*Attorney, Agent, or Firm*—Ernest E. Helms

[57] ABSTRACT

A vehicle seat is provided including a front leg with first and second ends, the front leg being pivotally attached to the vehicle floor adjacent the front leg first end; a seat cushion with front and rear ends, the front end being pivotally connected to the front leg second end; a rear leg with a second end pivotally connected to the seat cushion rear end, the rear leg having a first end pivotally connected to the vehicle floor, the rear leg first end having an attached first gear; a sector link having first and second ends, the sector link second end pivotally connected relative to the vehicle floor, the sector link second end having a second gear attached thereto being meshed with the first gear; an intermediate link with a rear end and a front end, the front end being pivotally connected to the sector link first end; and a seat back pivotally connected to the vehicle and pivotally connected to the rear end of the intermediate link, whereby when folding the seat back forwardly, the seat cushion forward end is displaced forwardly to a position more adjacent to the vehicle floor.

2 Claims, 4 Drawing Sheets

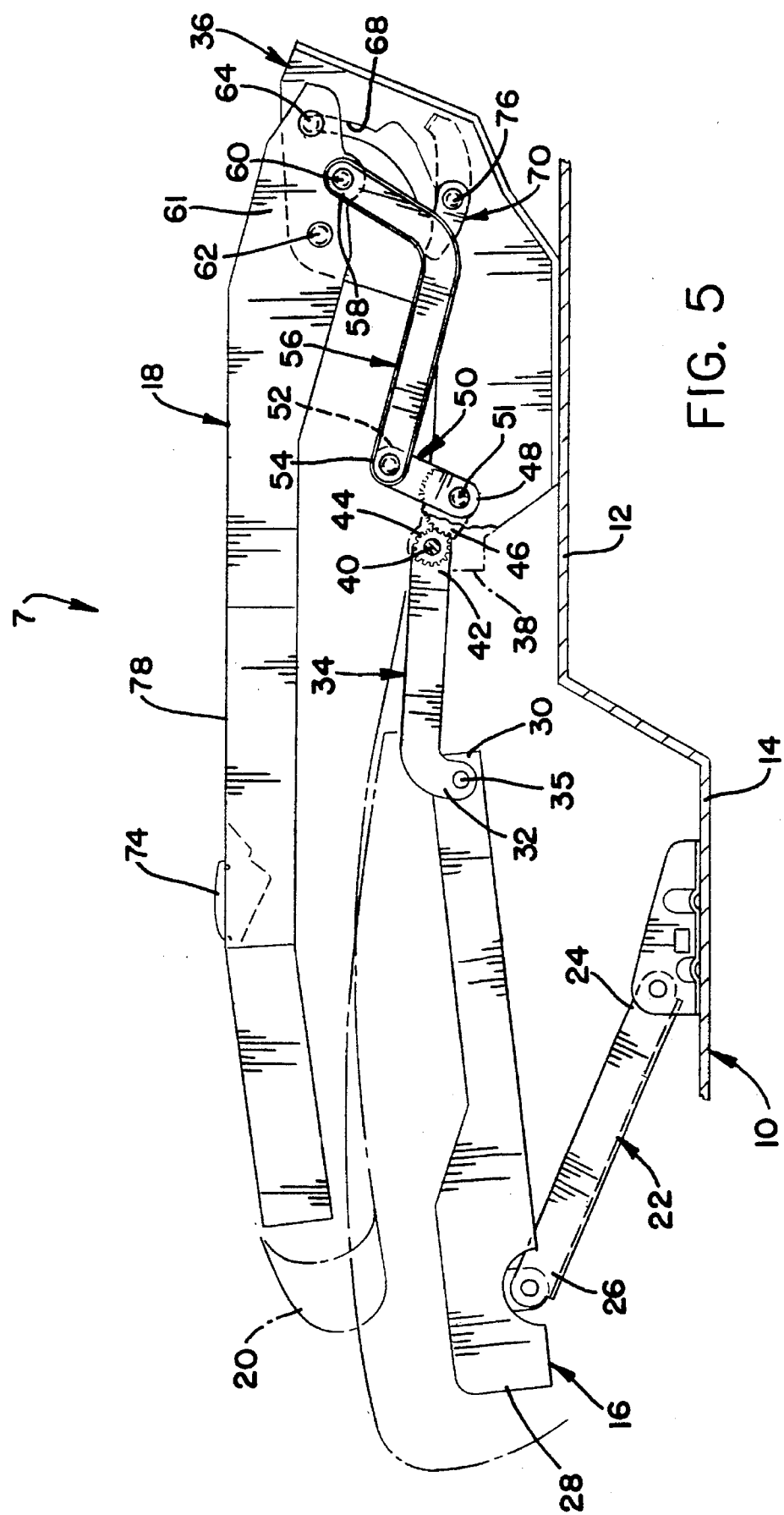

1

FOLDING SEAT

FIELD OF THE INVENTION

The field of the present invention is that of rear seating for sport utility-type vehicles which are foldable to a cargo position.

BACKGROUND OF THE INVENTION

A foldable type seat for a sport-type utility vehicle which is foldable to a cargo position is shown and described in Plavetich U.S. Pat. No. 4,699,418.

SUMMARY OF THE INVENTION

The present inventionrf provides an alternative seat to that shown in Plavetich which is more easily foldable to the cargo position and which is more suitable to rear seating with extended seat backs which incorporate an integral head rest.

BRIEF DESCRIPTION OF THE DRAWINGS

FIGS. 3, 4 and 5 are side elevational operational views of the present invention showing the seat in various stages of operation from the upright to the fully folded position.

DESCRIPTION OF THE PREFERRED EMBODIMENT

Figure 1:
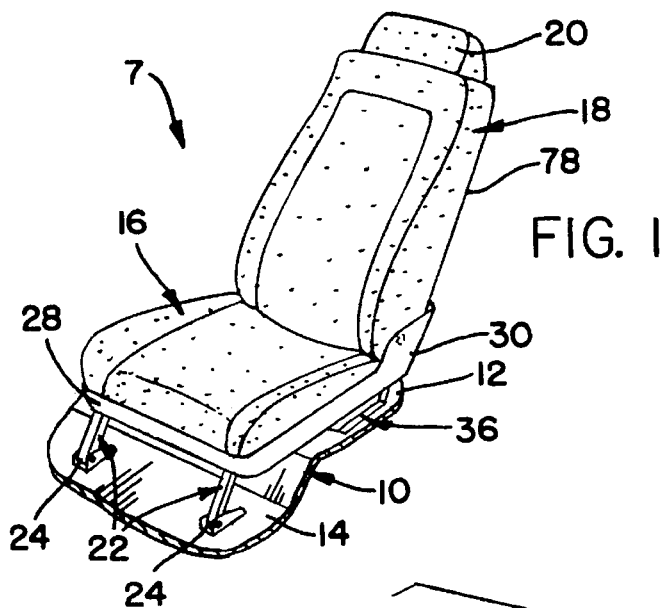
FIG. 1 is a perspective view of a preferred embodiment seat according to the present invention.
Figure 2:
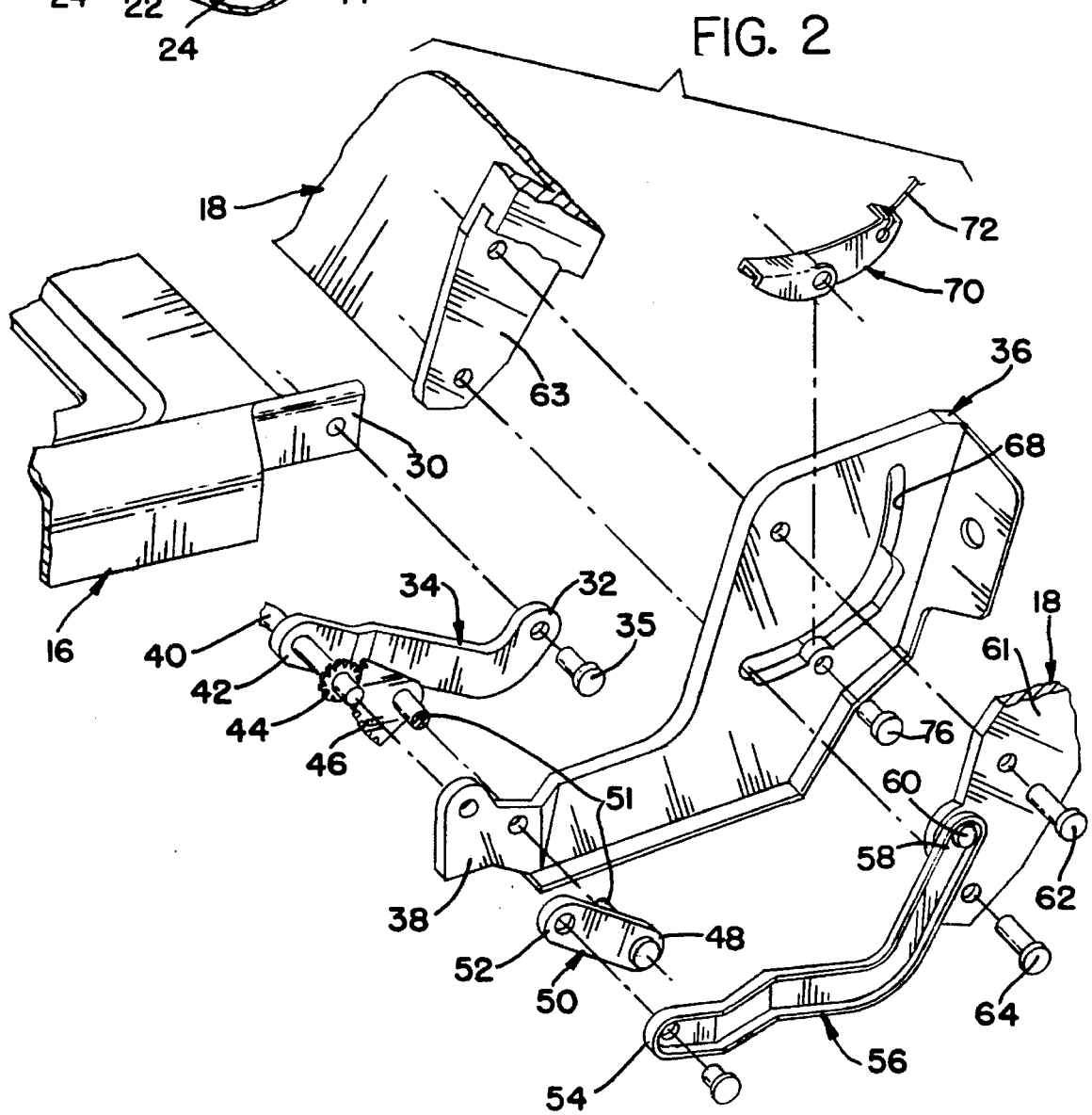
FIG. 2 is an exploded view of a side bracket hardware of a vehicle seat shown in FIG. 1.

Referring to FIGS. 1–5, a preferred embodiment vehicle seat 7 according to the present invention is shown in the environment of a rear seat of a sport utility vehicle having a floor 10 with an upper region 12 (typically over the wheel well) joined to a lower floor portion 14. The vehicle seat 7 has a seat cushion 16 and a seat back 18 with an extended integral head rest 20. A pair of front legs 22 have a first end 24 pivotally connected with respect to the vehicle floor portion 14. The front legs 22 have a second opposite end 26. The front legs 20 are pivotally connected to seat cushion 16 at its forward end 28. The seat cushion 16 adjacent its rearward end 30 is pivotally connected to a first end 32 of rear legs 34 via a pin 35 (only one leg 34 and pin 35 are shown).

Fixably connected to the upper portion 12 of the vehicle floor is a seat bracket 36. Seat bracket 36 has a forward inclined arm 38 which is pivotally connected via a transverse cross pin 40 with a second end 42 of the rear leg 34. The cross pin 40 is fixed with respect to the rear leg 34 and is also fixed to a rear leg on the opposite side of the seat cushion 16.

Figure 3:
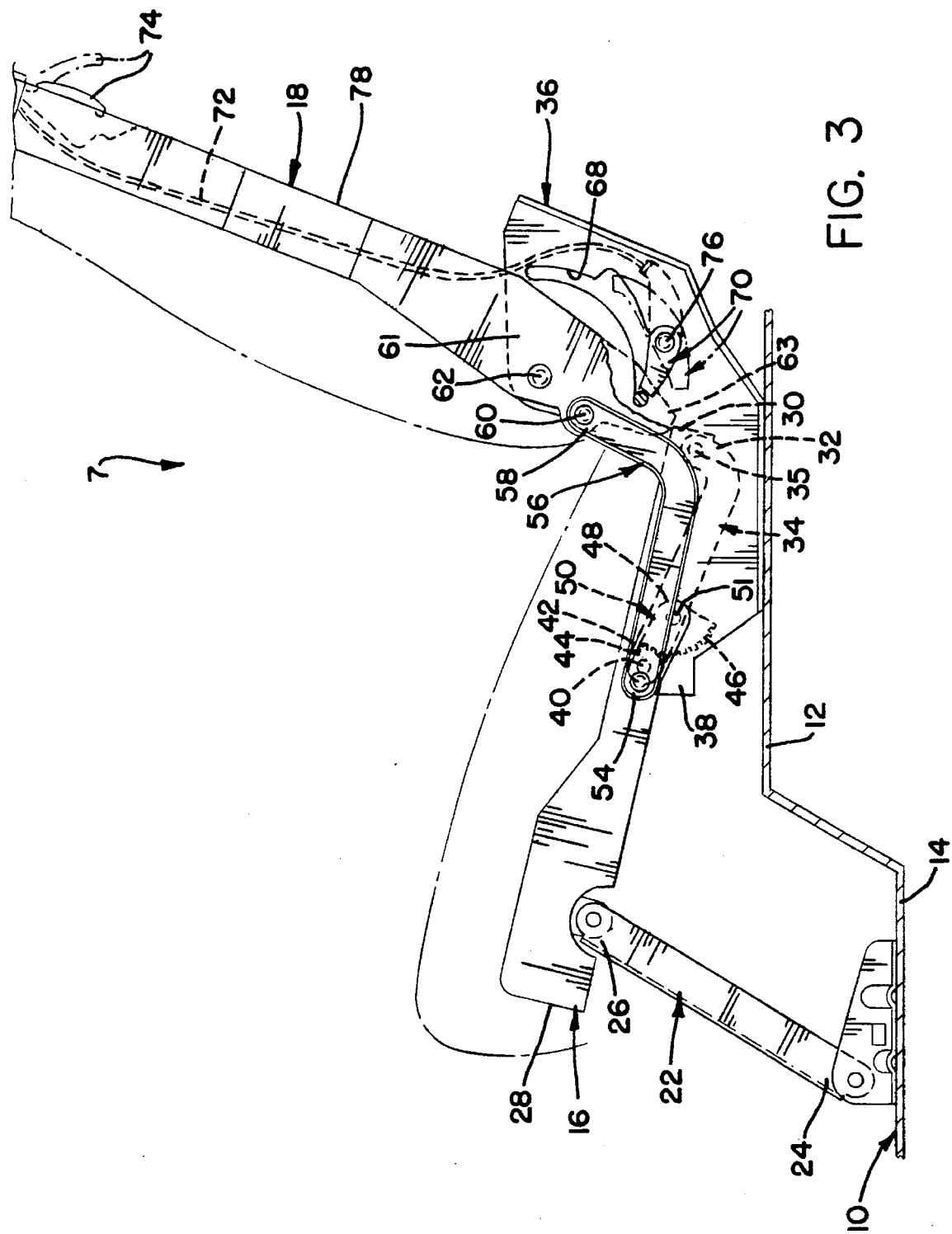

The rear leg 34 on at least one side has fixably attached to its second end 42 a first gear 44. The first gear 44 is meshed with a second or sector gear 46 which is fixably connected to a second end 48 of a sector link 50 via a pin 51. The sector link first end 52 is pivotally connected to the front end 54 of an intermediate link 56. The rear end 58 of intermediate link 56 is pivotally connected to the seat back 18 via a pin 60. The seat back 18 is pivotally connected to the bracket 36 via a pin 62. Pin 62 passes through inner and outer seat back flange members 61 and 63 which capture the bracket 36. The seat back also has a stop pin 64 which travels within channel 68 when released by locking pawl 70. The lock pawl 70 is actuated by a cable 72 which is manipulated by a handle 74. As will be obvious to those skilled in the art, a torsion spring will typically bias the lock pawl in a clockwise direction about pin 76 so as to keep the seat back in an upright position as best shown in FIG. 3 until pulled by cable 72 to a release position as shown in phantom.

Figure 4:
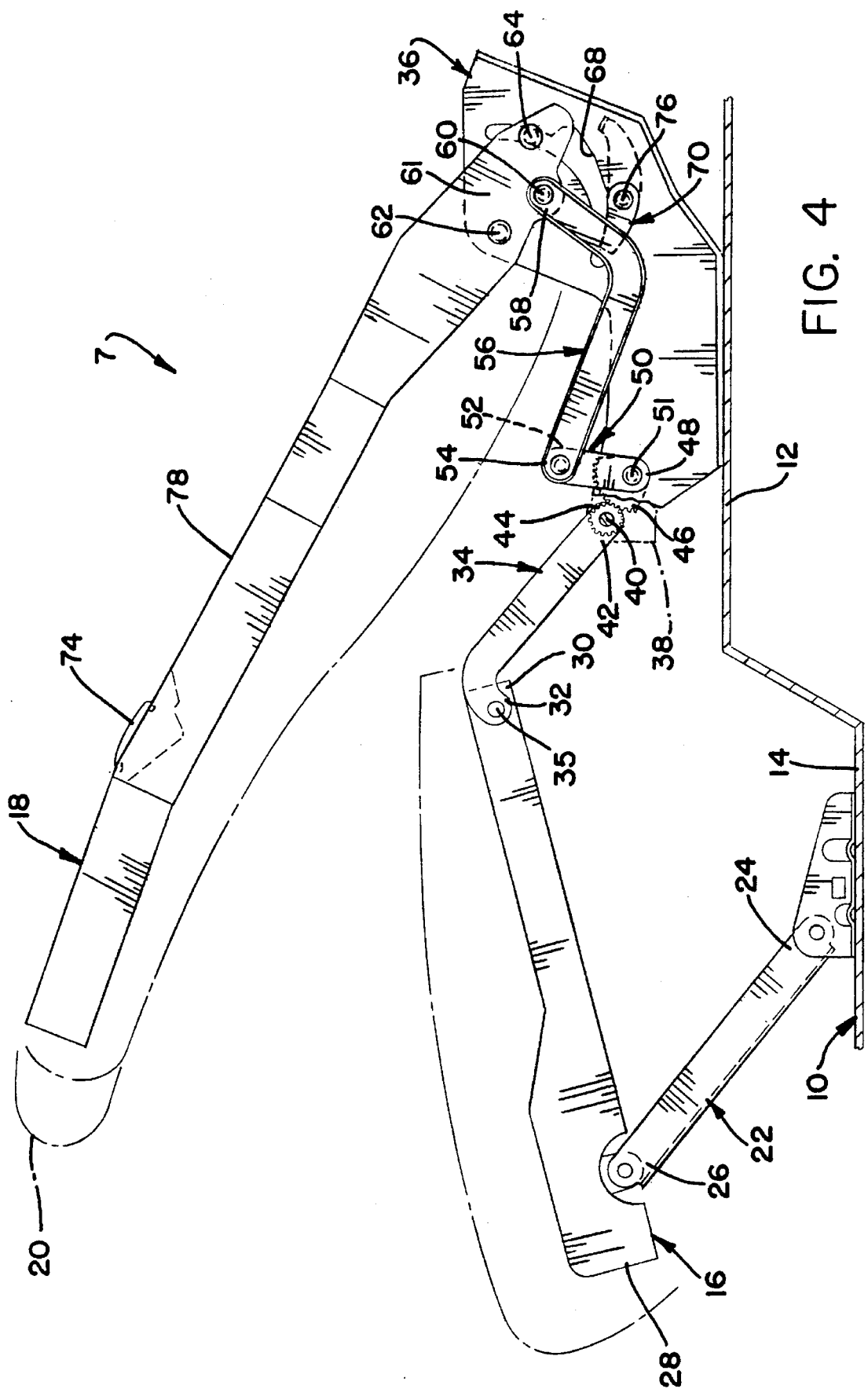

In operation, handle 74 will be manipulated pulling on cable 72, releasing the lock pawl 70 to turn counterclockwise about pin 76. The above action will allow the stop pin 64 to travel within channel 68, allowing the seat back to rotate counterclockwise as shown in FIG. 4. At the same time, the intermediate link 56 will be pulled rearwardly, causing the sector link 50 to rotate clockwise as shown in FIG. 4, causing the rear leg 34 to rotate counterclockwise. The counterclockwise rotation of the rear legs 34 about their second ends 32 will cause the seat bun 16 to be pushed forwardly, causing the forward end 28 to be displaced forwardly to a position more adjacent to the vehicle floor 10 as best shown in FIG. 5. A back surface 78 of the seat back may now be used for cargo, and the movement of the seat cushion 16 is accomplished automatically with the movement of the seat back 18. The force necessary to push the seat back forward will accomplish the folding of the seat 7 in one simple operation.

The present invention allows the seat cushion 16 to be fully independent of (not directly pivoted thereto) the seat back 18, thereby allowing for a longer seat back 18 in the fully folded position since the seat back 18 is not directly pivotally connected to the seat cushion 16. Therefore, the seat back 18 does not have to move forward (as in prior folded seats) when moving to the folded position. The foregoing allows greater seat back height without fear of interference with the seat back of seats positioned in a front row of the vehicle.

While this invention has been described in terms of a preferred embodiment thereof, it will be appreciated that other forms could readily be adapted by one skilled in the art. Accordingly, the scope of this invention is to be considered limited only by the following claims.

What is claimed is:

1. A vehicle seat comprising:

a front leg having first and second ends, the front leg being pivotally attached to the vehicle floor generally adjacent the front leg first end;

a seat cushion with front and rear ends, the seat cushion front end being pivotally connected to the front leg second end;

a rear leg with a second end pivotally connected adjacent the seat cushion rear end, the rear leg having a first end pivotally connected with respect to the vehicle floor, the rear leg first end having a first gear attached thereto;

a sector link having first and second ends, the sector link second end pivotally connected with respect to the vehicle floor, the sector link second end having a second gear attached thereto, the second gear being meshed with the first gear;

an intermediate link with a rear end and a front end, the intermediate link front end being pivotally connected to the sector link adjacent the sector link first end; and a seat back pivotally connected with respect to the vehicle floor and pivotally connected to the rear end of the intermediate link, whereby when folding the seat back forwardly, the seat cushion forward end is displaced forwardly to a position more adjacent to the vehicle floor.

2. A vehicle seat as described in claim 1 for placement in a vehicle with a multilevel floor wherein the front leg first end is at a level lower than the floor underneath the rear end of the seat cushion.

\* \* \* \* \*